(12) United States Patent
Finley et al.

(10) Patent No.: US 9,499,278 B1
(45) Date of Patent: *Nov. 22, 2016

(54) SYSTEM FOR AND METHOD OF DISPLAYING LEVELS OF TURBULENCE

(71) Applicant: Rockwell Collins, Inc., Cedar Rapids, IA (US)

(72) Inventors: Jeffery A. Finley, Cedar Rapids, IA (US); Mark C. Fersdahl, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/549,142

(22) Filed: Nov. 20, 2014

Related U.S. Application Data

(63) Continuation of application No. 13/760,964, filed on Feb. 6, 2013, now Pat. No. 8,907,817.

(51) Int. Cl.
*G08B 23/00* (2006.01)
*B64D 45/00* (2006.01)

(52) U.S. Cl.
CPC .................. B64D 45/00 (2013.01)

(58) Field of Classification Search
CPC ..................................... B64D 43/00
USPC .............. 340/949, 968, 539.28; 342/26 R
See application file for complete search history.

(56) References Cited

U.S. PATENT DOCUMENTS

| 3,251,057 | A | 5/1966 | Buehler et al. |
| 3,359,557 | A | 12/1967 | Fow et al. |
| 3,404,396 | A | 10/1968 | Buchler et al. |
| 3,465,339 | A | 9/1969 | Marner |
| 3,491,358 | A | 1/1970 | Hicks |
| 3,508,259 | A | 4/1970 | Andrews |
| 3,540,829 | A | 11/1970 | Collinson et al. |

(Continued)

FOREIGN PATENT DOCUMENTS

| EP | 1 329 738 B1 | 7/2003 |
| FR | 2658617 A1 | 8/1991 |

(Continued)

OTHER PUBLICATIONS

Action Closing Prosecution (37 CFR 1.949) in Inter Parties Reexamination of U.S. Pat. No. 7,161,525, control No. 95/001,860, mail date Nov. 15, 2012, 62 pages.

(Continued)

*Primary Examiner* — Brent Swarthout
(74) *Attorney, Agent, or Firm* — Donna P. Suchy; Daniel M. Barbieri

(57) ABSTRACT

A aircraft hazard warning system or method can be utilized to determine a location of turbulence, hail or other hazard for an aircraft. A processor can process weather radar data representative of weather conditions. An avionic display can display graphical elements representing the weather conditions in response to the processor. The display can provide at least one first graphical element representing a size and a location of the turbulence at a first level. The display can provide at least one second graphical element representing a size and a location of the turbulence at a second level. The size of the second graphical element can have a minimal displayable size and/or can be determined using an inflation factor.

20 Claims, 8 Drawing Sheets

(56) References Cited

U.S. PATENT DOCUMENTS

| | | |
|---|---|---|
| 3,567,915 A | 3/1971 | Altshuler et al. |
| 3,646,555 A | 2/1972 | Atlas |
| 3,715,748 A | 2/1973 | Hicks |
| 3,764,719 A | 10/1973 | Dell |
| 3,781,530 A | 12/1973 | Britland et al. |
| 3,781,878 A | 12/1973 | Kirkpatrick |
| 3,803,609 A | 4/1974 | Lewis et al. |
| 3,885,237 A | 5/1975 | Kirkpatrick |
| 3,943,511 A | 3/1976 | Evans et al. |
| 3,964,064 A | 6/1976 | Brandao et al. |
| 3,968,490 A | 7/1976 | Gostin |
| 4,015,257 A | 3/1977 | Fetter |
| 4,043,194 A | 8/1977 | Tanner |
| 4,223,309 A | 9/1980 | Payne |
| 4,283,715 A | 8/1981 | Choisnet |
| 4,283,725 A | 8/1981 | Chisholm |
| 4,318,100 A | 3/1982 | Shimizu et al. |
| 4,346,595 A | 8/1982 | Frosch et al. |
| 4,430,654 A | 2/1984 | Kupfer |
| 4,435,707 A | 3/1984 | Clark |
| 4,459,592 A | 7/1984 | Long |
| 4,533,915 A | 8/1985 | Lucchi et al. |
| 4,555,703 A | 11/1985 | Cantrell |
| 4,600,925 A | 7/1986 | Alitz et al. |
| 4,613,938 A | 9/1986 | Hansen et al. |
| 4,649,388 A | 3/1987 | Atlas |
| 4,658,255 A | 4/1987 | Nakamura et al. |
| 4,684,950 A | 8/1987 | Long |
| 4,742,353 A | 5/1988 | D'Addio et al. |
| 4,761,650 A | 8/1988 | Masuda et al. |
| 4,835,536 A | 5/1989 | Piesinger et al. |
| RE33,152 E | 1/1990 | Atlas |
| 4,914,444 A | 4/1990 | Pifer et al. |
| 4,928,131 A | 5/1990 | Onozawa |
| 4,940,987 A | 7/1990 | Frederick |
| 5,028,929 A | 7/1991 | Sand et al. |
| 5,036,334 A | 7/1991 | Henderson et al. |
| 5,049,886 A | 9/1991 | Seitz et al. |
| 5,059,967 A | 10/1991 | Roos |
| 5,077,558 A | 12/1991 | Kuntman |
| 5,111,400 A | 5/1992 | Yoder |
| 5,159,407 A | 10/1992 | Churnside et al. |
| 5,164,731 A | 11/1992 | Borden et al. |
| 5,173,704 A | 12/1992 | Buehler et al. |
| 5,177,487 A | 1/1993 | Taylor et al. |
| 5,198,819 A | 3/1993 | Susnjara |
| 5,202,690 A | 4/1993 | Frederick |
| 5,208,600 A | 5/1993 | Rubin |
| 5,262,773 A | 11/1993 | Gordon |
| 5,291,208 A | 3/1994 | Young |
| 5,296,865 A | 3/1994 | Lewis |
| 5,311,183 A | 5/1994 | Mathews et al. |
| 5,311,184 A | 5/1994 | Kuntman |
| 5,331,330 A | 7/1994 | Susnjara |
| 5,396,220 A | 3/1995 | Markson et al. |
| 5,469,168 A | 11/1995 | Anderson |
| 5,479,173 A | 12/1995 | Yoshioka et al. |
| 5,485,157 A | 1/1996 | Long |
| 5,517,193 A | 5/1996 | Allison et al. |
| 5,521,603 A | 5/1996 | Young |
| 5,534,868 A | 7/1996 | Gjessing et al. |
| 5,568,151 A | 10/1996 | Merritt |
| 5,583,972 A | 12/1996 | Miller |
| 5,592,171 A | 1/1997 | Jordan |
| 5,602,543 A | 2/1997 | Prata et al. |
| 5,648,782 A | 7/1997 | Albo et al. |
| 5,654,700 A | 8/1997 | Prata et al. |
| 5,657,009 A | 8/1997 | Gordon |
| 5,686,919 A | 11/1997 | Jordan et al. |
| 5,726,656 A | 3/1998 | Frankot |
| 5,757,322 A | 5/1998 | Ray et al. |
| 5,771,020 A | 6/1998 | Markson et al. |
| 5,828,332 A | 10/1998 | Frederick |
| 5,839,080 A | 11/1998 | Muller et al. |
| 5,907,568 A | 5/1999 | Reitan, Jr. |
| 5,920,276 A | 7/1999 | Frederick |
| 5,945,926 A | 8/1999 | Ammar et al. |
| 5,973,635 A | 10/1999 | Albo |
| 6,081,220 A | 6/2000 | Fujisaka et al. |
| 6,138,060 A | 10/2000 | Conner et al. |
| 6,154,151 A | 11/2000 | McElreath et al. |
| 6,154,169 A | 11/2000 | Kuntman |
| 6,177,873 B1 | 1/2001 | Cragun |
| 6,184,816 B1 | 2/2001 | Zheng et al. |
| 6,201,494 B1 | 3/2001 | Kronfeld |
| 6,208,284 B1 | 3/2001 | Woodell et al. |
| 6,236,351 B1 | 5/2001 | Conner et al. |
| 6,240,369 B1 | 5/2001 | Foust |
| 6,246,367 B1 | 6/2001 | Markson et al. |
| 6,289,277 B1 | 9/2001 | Feyereisen et al. |
| 6,297,772 B1 | 10/2001 | Lewis |
| 6,308,122 B1 | 10/2001 | Nishizaki et al. |
| 6,340,946 B1 | 1/2002 | Wolfson et al. |
| 6,381,538 B1 | 4/2002 | Robinson et al. |
| 6,388,607 B1 | 5/2002 | Woodell |
| 6,388,608 B1 | 5/2002 | Woodell et al. |
| RE37,725 E | 6/2002 | Yamada |
| 6,405,134 B1 | 6/2002 | Smith et al. |
| 6,424,288 B1 | 7/2002 | Woodell |
| 6,456,226 B1 | 9/2002 | Zheng et al. |
| 6,480,142 B1 | 11/2002 | Rubin |
| 6,489,915 B1 | 12/2002 | Lines et al. |
| 6,496,252 B1 | 12/2002 | Whiteley |
| 6,512,476 B1 | 1/2003 | Woodell |
| 6,518,914 B1 | 2/2003 | Peterson et al. |
| 6,549,161 B1 | 4/2003 | Woodell |
| 6,560,538 B2 | 5/2003 | Schwinn et al. |
| 6,563,452 B1 | 5/2003 | Zheng et al. |
| 6,577,947 B1 | 6/2003 | Kronfeld et al. |
| 6,590,520 B1 | 7/2003 | Steele et al. |
| 6,597,305 B2 | 7/2003 | Szeto et al. |
| 6,603,425 B1 | 8/2003 | Woodell |
| 6,606,564 B2 | 8/2003 | Schwinn et al. |
| 6,614,382 B1 | 9/2003 | Cannaday et al. |
| 6,650,275 B1 | 11/2003 | Kelly et al. |
| 6,650,972 B1 | 11/2003 | Robinson et al. |
| 6,667,710 B2 | 12/2003 | Cornell et al. |
| 6,670,908 B2 | 12/2003 | Wilson et al. |
| 6,677,886 B1 | 1/2004 | Lok |
| 6,683,609 B1 | 1/2004 | Baron et al. |
| 6,690,317 B2 | 2/2004 | Szeto et al. |
| 6,703,945 B2 | 3/2004 | Kuntman et al. |
| 6,720,906 B2 | 4/2004 | Szeto et al. |
| 6,738,010 B2 | 5/2004 | Steele et al. |
| 6,741,203 B1 | 5/2004 | Woodell |
| 6,744,382 B1 | 6/2004 | Lapis et al. |
| 6,771,207 B1 | 8/2004 | Lang |
| 6,788,043 B2 | 9/2004 | Murphy et al. |
| 6,791,311 B2 | 9/2004 | Murphy et al. |
| 6,828,923 B2 | 12/2004 | Anderson |
| 6,839,018 B2 | 1/2005 | Szeto et al. |
| 6,850,185 B1 | 2/2005 | Woodell |
| 6,856,908 B2 | 2/2005 | Devarasetty et al. |
| 6,879,280 B1 | 4/2005 | Bull et al. |
| 6,882,302 B1 | 4/2005 | Woodell et al. |
| 6,917,860 B1 | 7/2005 | Robinson et al. |
| 6,977,608 B1 | 12/2005 | Anderson et al. |
| 7,030,805 B2 | 4/2006 | Ormesher et al. |
| 7,042,387 B2 | 5/2006 | Ridenour et al. |
| 7,082,382 B1 | 7/2006 | Rose et al. |
| 7,109,912 B1 | 9/2006 | Paramore et al. |
| 7,109,913 B1 | 9/2006 | Paramore et al. |
| 7,116,266 B1 | 10/2006 | Vesel et al. |
| 7,129,885 B1 | 10/2006 | Woodell et al. |
| 7,132,974 B1 | 11/2006 | Christianson |
| 7,139,664 B2 | 11/2006 | Kelly et al. |
| 7,145,503 B2 | 12/2006 | Abramovich et al. |
| 7,161,525 B1 | 1/2007 | Finley et al. |
| 7,200,491 B1 | 4/2007 | Rose et al. |
| 7,242,343 B1 | 7/2007 | Woodell |
| 7,259,714 B1 | 8/2007 | Cataldo |
| 7,292,178 B1 | 11/2007 | Woodell et al. |
| 7,307,576 B1 | 12/2007 | Koenigs |
| 7,307,577 B1 | 12/2007 | Kronfeld et al. |

(56) References Cited

U.S. PATENT DOCUMENTS

| | | | |
|---|---|---|---|
| 7,307,583 | B1 | 12/2007 | Woodell et al. |
| 7,307,756 | B2 | 12/2007 | Walmsley |
| 7,352,317 | B1 | 4/2008 | Finley et al. |
| 7,352,929 | B2 | 4/2008 | Hagen et al. |
| 7,372,394 | B1 | 5/2008 | Woodell et al. |
| 7,383,131 | B1 | 6/2008 | Wey et al. |
| 7,417,579 | B1 | 8/2008 | Woodell |
| 7,486,219 | B1 | 2/2009 | Woodell et al. |
| 7,486,220 | B1 | 2/2009 | Kronfeld et al. |
| 7,492,304 | B1 | 2/2009 | Woodell et al. |
| 7,492,305 | B1 | 2/2009 | Woodell et al. |
| 7,515,087 | B1 | 4/2009 | Woodell et al. |
| 7,515,088 | B1 | 4/2009 | Woodell et al. |
| 7,528,613 | B1 | 5/2009 | Thompson et al. |
| 7,541,971 | B1 | 6/2009 | Woodell et al. |
| 7,576,680 | B1 | 8/2009 | Woodell |
| 7,598,901 | B2 | 10/2009 | Tillotson et al. |
| 7,598,902 | B1 | 10/2009 | Woodell et al. |
| 7,609,200 | B1 | 10/2009 | Woodell et al. |
| 7,616,150 | B1 | 11/2009 | Woodell |
| 7,633,431 | B1 | 12/2009 | Wey et al. |
| 7,639,175 | B1 | 12/2009 | Woodell |
| 7,696,921 | B1 | 4/2010 | Finley et al. |
| 7,714,767 | B1 | 5/2010 | Kronfeld et al. |
| 7,843,380 | B1 | 11/2010 | Woodell |
| 7,859,448 | B1 | 12/2010 | Woodell et al. |
| 7,859,449 | B1 | 12/2010 | Woodell et al. |
| 7,889,117 | B1 | 2/2011 | Woodell et al. |
| 7,917,255 | B1 | 3/2011 | Finley |
| 7,973,698 | B1 | 7/2011 | Woodell et al. |
| 8,072,368 | B1 | 12/2011 | Woodell |
| 8,248,274 | B2 | 8/2012 | Christophe et al. |
| 8,515,600 | B1 | 8/2013 | McCusker |
| 8,902,100 | B1 | 12/2014 | Woodell et al. |
| 8,907,817 | B1 * | 12/2014 | Finley et al. ............... 340/968 |
| 2003/0001770 | A1 | 1/2003 | Cornell et al. |
| 2003/0016156 | A1 | 1/2003 | Szeto et al. |
| 2005/0049789 | A1 | 3/2005 | Kelly et al. |
| 2006/0036366 | A1 | 2/2006 | Kelly et al. |
| 2007/0018974 | A1 * | 1/2007 | Fujiwara ............ G09B 29/12 345/419 |
| 2009/0251356 | A1 | 10/2009 | Margomenos |
| 2010/0327068 | A1 | 12/2010 | Chen et al. |
| 2013/0207274 | A1 | 8/2013 | Liu et al. |
| 2014/0145883 | A1 | 5/2014 | Baks et al. |

FOREIGN PATENT DOCUMENTS

| | | |
|---|---|---|
| WO | WO-98/07047 A1 | 2/1998 |
| WO | WO-98/22834 A1 | 5/1998 |
| WO | WO-03/005060 A1 | 1/2003 |
| WO | WO-2009/137158 | 11/2009 |

OTHER PUBLICATIONS

Advisory Action dated Jun. 24, 2010 for U.S. Appl. No. 10/978,680 (3 pages).
Advisory Action for U.S. Appl. No. 12/075,103, mail date Nov. 8, 2010, 3 pages.
Advisory Action for U.S. Appl. No. 12/075,103, mail date Oct. 15, 2010, 3 pages.
AN/APG Active Electronically Scanned Array AESA, www.globalsecurity.org/military/systems/aircraft/systems/an-apg-aesa.htm, retrieved on Feb. 26, 2013, 6 pages.
Bovith et al., Detecting Weather Radar Clutter by Information Fusion with Satellite Images and Numerical Weather Prediction Model Output; Jul. 31-Aug. 4, 2006, 4 pages.
Burnham et al., Thunderstorm Turbulence and Its Relationship to Weather Radar Echoes, J. Aircraft, Sep.-Oct. 1969, 8 pages.
Corridor Integrated Weather System (CIWS), www.ll.mit.edu/mission/aviation/faawxsystems/ciws.html, received on Aug. 19, 2009, 3 pages.

U.S. Appl. No. 13/183,314, filed Jul. 14, 2011, Sishtla et al.
U.S. Appl. No. 13/781,449, filed Feb. 28, 2013, West et al.
Decision on Appeal for Inter Parties Reexamination Control No. 95/001,860, dated Oct. 17, 2014, 17 pages.
Doviak et al., Doppler Radar and Weather Observations, 1984, 298 pages.
Dupree et al.,FAA Tactical Weather Forecasting in the United States National Airspace, 29 pages.
Examiner's Answer to Appeal Brief in Inter Parties Reexamination of U.S. Pat. No. 7,161,525, control No. 95/001,860, mail date Aug. 20, 2013, 3 pages.
Exhibits Filed by Third Party in Inter Parties Reexamination of U.S. Pat. No. 7,161,525, control No. 95/001,860, filed May 30, 2012, 7 pages.
Goodman et al., LISDAD Lightning Observations during the Feb. 22-23, 1998 Central Florida Tornado Outbreak, http:www.srh.noaa.gov/topics/attach/html/ssd98-37.htm, Jun. 1, 1998, 5 pages.
Hodanish, Integration of Lightning Detection Systems in a Modernized National Weather Service Office, http://www.srh.noaa.gov/mlb/hoepub.html, retrieved on Aug. 6, 2007, 5 pages.
Honeywell, RDR-4B Forward Looking Windshear Detection/Weather Radar System User's Manual With Radar Operation Guidelines (Rev. 6) Jul. 2003, 106 pages.
Keith, Transport Category Airplane Electronic Display Systems, Jul. 16, 1987, 34 pages.
Klingle-Wilson et al., Description of Corridor Integrated Weather System (CIWS) Weather Products, Aug. 1, 2005, 120 pages.
Kuntman et al., Turbulence Detection and Avoidance System, International Air Safety Seminar, Oct. 29, 2000, 13 pages.
Kuntman, Daryal, "Airborne System to Address Leading Cause of Injuries in Non-Fatal Airline Accidents," ICAO Journal, vol. 5, No. 2, Mar. 2000, 4 pages.
Meteorological/KSC/L71557/Lighting Detection and Ranging (LDAR), Jan. 2002, 12 pages.
Nathanson, Fred E., "Radar and Its Composite Environment," Radar Design Principles, Signal Processing and the Environment, 1969, 5 pages, McGraw-Hill Book Company, New York et al.
Non-Final Office Action in Inter Parties Reexamination of U.S. Pat. No. 7,161,525, control No. 95/001,860, mail date Mar. 2, 2012, 28 pages.
Notice of Allowance for U.S. Appl. No. 10/631,253, mail date Jul. 28, 2005, 7 pages.
Notice of Allowance for U.S. Appl. No. 11/256,845, mail date May 27, 2009, 7 pages.
Notice of Allowance for U.S. Appl. No. 11/370,085, mail date Dec. 30, 2008, 6 pages.
Notice of Allowance for U.S. Appl. No. 11/402,434, mail date Nov. 4, 2008, 6 pages.
Notice of Allowance for U.S. Appl. No. 11/515,642, mail date Jun. 24, 2010, 6 pages.
Notice of Allowance for U.S. Appl. No. 12/360,651, mail date Sep. 23, 2011, 6 pages.
Notice of Allowance for U.S. Appl. No. 12/405,091, mail date Mar. 19, 2012, 8 pages.
Notice of Allowance on U.S. Appl. No. 11/323,196 mailed on Apr. 19, 2010.
Notice of Appeal to the Patent Trial and Appeal Board in Inter Parties Reexamination of U.S. Pat. No. 7,161,525, control No. 95/001,860, dated Mar. 4, 2013, 2 pages.
Office Action for U.S. Appl. No. 11/256,845, mail date Aug. 21, 2007, 4 pages.
Office Action for U.S. Appl. No. 10/631,253, mail date Jan. 14, 2004, 5 pages.
Office Action for U.S. Appl. No. 10/631,253, mail date Jun. 30, 2004, 4 pages.
Office Action for U.S. Appl. No. 11/256,845, mail date Dec. 5, 2006, 5 pages.
Office Action for U.S. Appl. No. 11/256,845, mail date Jul. 28, 2008, 5 pages.
Office Action for U.S. Appl. No. 11/256,845, mail date Jun. 22, 2006, 5 pages.
Office Action for U.S. Appl. No. 11/370,085, mail date Aug. 15, 2007, 10 pages.

(56) References Cited

OTHER PUBLICATIONS

Office Action for U.S. Appl. No. 11/370,085, mail date Dec. 4, 2007, 13 pages.
Office Action for U.S. Appl. No. 11/370,085, mail date Oct. 9, 2008, 5 pages.
Office Action for U.S. Appl. No. 11/402,434, mail date Jul. 17, 2008, 5 pages.
Office Action for U.S. Appl. No. 11/402,434, mail date Mar. 29, 2007, 8 pages.
Office Action for U.S. Appl. No. 11/402,434, mail date Oct. 26, 2006, 7 pages.
Office Action for U.S. Appl. No. 11/402,434, mail date Sep. 20, 2007, 7 pages.
Office Action for U.S. Appl. No. 11/515,642, mail date Dec. 22, 2008, 5 pages.
Office Action for U.S. Appl. No. 11/515,642, mail date Feb. 12, 2008, 7 pages.
Office Action for U.S. Appl. No. 11/515,642, mail date Jan. 5, 2010, 5 pages.
Office Action for U.S. Appl. No. 12/075,103, mail date Feb. 26, 2010, 11 pages.
Office Action for U.S. Appl. No. 12/075,103, mail date Jul. 29, 2010, 7 pages.
Office Action for U.S. Appl. No. 12/075,103, mail date Jun. 20, 2012, 5 pages.
Office Action for U.S. Appl. No. 12/075,103, mail date Nov. 29, 2012, 6 pages.
Office Action for U.S. Appl. No. 12/405,091, mail date Aug. 18, 2011, 7 pages.
Office Action for U.S. Appl. No. 12/405,091, mail date Feb. 25, 2011, 6 pages.
Office Action on U.S. Appl. No. 13/760,964 Dated Apr. 23, 2014, 7 pages.
Order Granting Request for Inter Parties Reexamination in Inter Parties Reexamination of U.S. Pat. No. 7,161,525, control No. 95/001,860, mail date Mar. 2, 2012, 21 pages.
Original Request for Inter Parties Reexamination of U.S. Pat. No. 7,161,525 filed by Honeywell International Inc., and supporting exhibits in Inter Parties Reexamination of U.S. Pat. No. 7,161,525, control No. 95/001,860, filed Dec. 21, 2011.
Patent Owner's Response to Board Decision in Inter Parties Reexamination of U.S. Pat. No. 7,161,525, control No. 95/001,860 including Exhibits A, B, and C, filed Nov. 17, 2014, 65 pages.
Patent Owner's Response to Office Action in Inter Parties Reexamination of U.S. Pat. No. 7,161,525, control No. 95/001,860 filed May 1, 2012, 57 pages.
Pessi et al., On the Relationship Between Lightning and Convective Rainfall Over the Central Pacific Ocean, date unknown, 9 pages.
Respondent's Brief in Inter Parties Reexamination of U.S. Pat. No. 7,161,525, control No. 95/001,860, filed Jun. 21, 2013, 29 pages.
Right of Appeal Notice in Inter Parties Reexamination of U.S. Pat. No. 7,161,525, control No. 95/001,860, mail date Feb. 22, 2013, 63 pages.
Third Party Requester Comments submitted by Honeywell International Inc. in Inter Parties Reexamination of U.S. Pat. No. 7,161,525, control No. 95/001,860, 34 pages.
Third Party Requester's Brief on Appeal in Inter Parties Reexamination of U.S. Pat. No. 7,161,525, control No. 95/001,860, filed May 22, 2013, 46 pages.
Third Party Requester's Rebuttal Brief in Inter Parties Reexamination of U.S. Pat. No. 7,161,525, control No. 95/001,860, filed Sep. 20, 2013, 21 pages.
Waldvogel et al., The Kinetic Energy of Hailfalls. Part I: Hailstone Spectra, Journal of Applied Meteorology, Apr. 1978, 8 pages.
Wilson et al., The Complementary Use of Titan-Derived Radar and Total Lightning Thunderstorm Cells, 10 pages.
Zipser et al., The Vertical Profile of Radar Reflectivity and Convective Cells: A Strong Indicator of Storm Intensity and Lightning Probability? America Meteorological Society, 1994, 9 pages.
Dupree et al.,FAA Tactical Weather Forecasting in the United States National Airspace, Proceedings from the World Weather Research Symposium on Nowcasting and Very Short Term Forecasts, Toulouse, France, 2005, 29 pages.
Ex-Parte Quayle Action Received in U.S. Appl. No. 13/781,449, dated Dec. 24, 2014, 6 pages.
Wilson et al., The Complementary Use of Titan-Derived Radar and Total Lightning Thunderstorm Cells, paper presented on Oct. 16, 2005, 10 pages.
Non-Final Office Action on U.S. Appl. No. 13/837,934 dated Nov. 25, 2015, 10 pages.

* cited by examiner

SYSTEM FOR AND METHOD OF DISPLAYING LEVELS OF TURBULENCE

CROSS-REFERENCE TO RELATED APPLICATIONS

The present application is a continuation of U.S. application Ser. No. 13/760,964, now U.S. Pat. No. 8,907,817, filed Feb. 6, 2013, entitled "SYSTEM FOR AND METHOD OF DISPLAYING LEVELS OF TURBULENCE" by Finley et al., and is related to U.S. application Ser. No. 12/075,103, now U.S. Pat. No. 8,902,100, filed on Mar. 7, 2008, entitled "SYSTEM AND METHOD FOR TURBULENCE DETECTION" by Woodell et al., U.S. Pat. No. 7,515,087, U.S. Pat. No. 7,486,219, U.S. Pat. No. 7,598,902, U.S. Pat. No. 7,161,525 (Rexam Control No. 95/001,860), and U.S. Pat. No. 7,129,885 which are all herein incorporated by reference in their entireties and assigned to the assignee of the present application.

BACKGROUND

This application relates generally to the identification of turbulence. More particularly, this application relates to the identification of levels of turbulence by hazard warning systems.

Hazardous weather generally includes turbulence. Hazard warning systems are often configured to detect turbulence and utilized in a variety of applications including vehicle weather warning systems, such as aircraft weather warning systems (e.g., aircraft weather radar systems). With the large amount of air traffic and rising fuel costs, pilots are interested in identifying levels of turbulence so they do not unnecessarily avoid flight routes through non-hazardous weather. Turbulence levels above certain thresholds can be dangerous to the aircraft, crew and passengers and/or cause significant discomfort, while lower levels of turbulence may only affect ride quality of the flight. Accordingly, accurate identification and display of turbulence and its levels are desirable.

Pilots generally rely upon avionic weather radar systems to detect turbulence. Weather radar systems generally include an antenna, a receiver/transmitter circuit, a processor, and display. The processor is coupled between the display and the receiver/transmitter circuit. The receiver/transmitter circuit is coupled between the processor and the antenna. The processor commands transmit signals through the receiver/transmitter circuit to the antenna to transmit radar beams. The processor receives radar return signals derived from radar returns received by the antenna. The radar return signals are provided to the processor via the receiver/transmitter circuit.

Conventionally, the radar return signals are processed to provide graphical images to a radar display. The radar display is typically a color display providing graphical images in color to represent the severity of weather. Some aircraft systems also include other hazard warning systems such as a turbulence detection system. The turbulence detection system can provide indications of the presence of turbulence or other hazards on the display and can be part of the weather radar system.

Conventional aircraft hazard weather radar systems, such as the WXR 2100 MultiScan™ radar system manufactured by Rockwell Collins, Inc., have Doppler capabilities and are capable of detecting at least four parameters: weather range, weather reflectivity, weather velocity, and weather spectral width or velocity variation. The weather reflectivity is typically scaled to and displayed as green, yellow, and red color levels that are related to rainfall rate. The radar-detected radial velocity variation or spectral width can be scaled to a turbulence level and displayed as magenta.

U.S. Pat. No. 7,161,525 discloses the display of levels of turbulence on a weather radar display using speckled or dotted areas. Federal Aviation Administration (FAA) standard TSO C63d specifies that if two levels of turbulence are displayed, the severe turbulence area must be distinguished from the lighter level of turbulence.

Thus, there is a need for a system for and/or a method of more accurate display of turbulence. There is also need for a system that can display levels of turbulence in a readily identifiable fashion. There is also a need for ensuring that even small areas of high turbulence are displayed and identifiable. There is also a need to display small areas of higher turbulence when they are located in larger regions of ride quality turbulence. Yet further, there is a need for a aircraft hazard warning system optimized to highlight at least one higher level of turbulence.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One embodiment of the disclosure relates to a method of displaying areas of turbulent weather. The method comprises processing data representative of weather, displaying the weather conditions on a display, and detecting turbulence. The method also comprises providing at least one first graphical element on the display. The first graphical element has a first size and a first location representing a size and a location of the turbulence at a first level, the first level being below a threshold. The method also comprises providing at least one second graphical element on the display. The second graphical element has a second size and second location representing a size and a location of the turbulence at a second level, the second level being above the threshold. The second size of the second graphical element has: 1. a minimal displayable size 2. is determined using an inflation factor, or 3. both has a minimal displayable size and is determined using an inflation factor.

Another embodiment of the disclosure relates to an avionics weather display system. The avionics weather display system comprises a processor for processing weather radar data representative of weather conditions, and an avionic display for displaying graphical elements representing the weather conditions in response to the processor. The processor detects turbulence and causes the display to provide at least one first graphical element. The first graphical element has a first size and a first location representing a size and a location of the turbulence at a first level, the first level being below a threshold. The processor causes the display to provide at least one second graphical element. The second graphical element has a second size and second location representing a size and a location of the turbulence at a second level, the second level being above the threshold. The second size of the second graphical element has a minimal displayable size or is determined using an inflation factor.

Another embodiment of the disclosure relates to a program for an avionics weather display system stored on a non-transitory medium. The program includes instructions for causing at least one electronic processor to:

detect turbulence at a first level below a first threshold and at a second level above the first threshold from weather radar data;

cause a display to provide at least one first graphical element; and cause a display to provide at least one second graphical element. The first graphical element has a first size and a first location representing a size and a location of the turbulence at a first level. The second graphical element has a second size and second location representing a size and a location of the turbulence at a second level. The second size of the second graphical element has a minimal displayable size or is determined using an inflation factor.

BRIEF DESCRIPTION OF THE DRAWINGS

The embodiments will become more fully understood from the following detailed description, taken in conjunction with the accompanying drawings, wherein like reference numerals refer to like elements, in which.

DETAILED DESCRIPTION OF THE EXEMPLARY EMBODIMENTS

Figure 1:
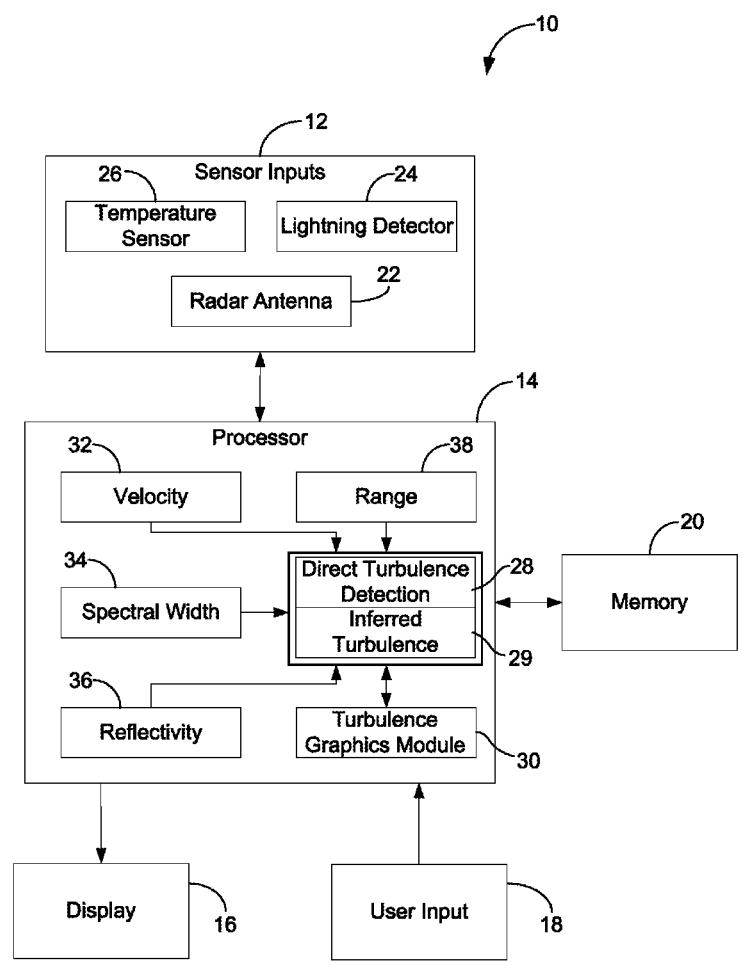
FIG. 1 is a schematic block diagram of a hazard warning system according to an exemplary embodiment.

Before describing in detail the particular improved system and method, it should be observed that the invention includes, but is not limited to a novel structural combination of conventional data/signal processing components, and not in the particular detailed configurations thereof. Accordingly, the structure, methods, functions, control and arrangement of conventional components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

An aircraft hazard warning system or other avionic system may detect and/or infer turbulence and display levels of turbulence on a display in one embodiment. The hazard warning system can provide indications of levels of turbulence over indications of reflectivity in one embodiment. In one embodiment, lower levels of turbulence (e.g., ride through turbulence) are indicated by speckled or dotted regions of magenta superimposed over the display of weather; the speckled regions allow the underlying weather to be viewed in one embodiment. Advantageously, superimposition of speckled regions allows pilots to view underlying precipitation rates associated with the weather on the display in one embodiment. Higher levels of turbulence are shown by solid magenta and hide the underlying precipitation rates in one embodiment. Although specific types of indicators of levels of turbulence or graphical representations are described herein, other types of representations and symbols can be utilized without departing from the scope of the invention.

According to one embodiment, solid magenta regions representing a higher level of turbulence are increased in size if they are below a minimum size so that they are not mistaken for magenta speckles or dots associated with the regions of lower levels of turbulence. According to another embodiment, an inflation factor can be utilized for regions of graphical symbols of higher levels of turbulence. The inflation factor can be a function of peak turbulence within a given radius, turbulence detection density (e.g., the number of turbulence detections which exceed a threshold of any given radius), a filtered peak turbulence within a given region, or a combination of these as explained below. The inflation factor is used to increase the size of the turbulence area at the higher level by expanding the region according to any type of graphical expansion algorithm according to one embodiment.

As described below, turbulence areas may be determined by any number of algorithms and detection schemes including those described in the patents incorporated herein by reference. The specific method of turbulence detection does not limit the claims. Both inferred turbulence detection and actual turbulence detection using spectral width can utilize the principles of the present invention without departing from the scope of the claims.

Generally, a weather radar system or hazard warning system 10 can be configured to provide hazard warnings, such as turbulence warnings. Alternatively, other turbulence related parameters can be used to determine the level of turbulence. Further, more than two levels of turbulence can be determined and displayed.

The turbulence and the levels associated with the turbulence can be detected by processor 14 as described below. Processor 14 includes one or both of a direct turbulence detection module or detector 28 and an inferred turbulence detection module or detector 29. The calculation of the g load for turbulence can be calculated using a number of algorithms including algorithms which utilize aircraft weight, wing loading, altitude, and airspeed and other parameters as well as spectral width. An indication of a higher level of turbulence such as a solid magenta area on a display 16 corresponding to the size and location of the higher level of turbulence can be provided by processor 14 and a turbulence graphics module 30.

In one embodiment, processor 14 employs a radar turbulence detection algorithms as determined through regulatory guidance to provide detection and alerting of turbulence levels above 0.3 g RMS vertical load. A radar threshold for detection can correspond to about 0.2 g to 0.22 g which allows detections of 0.3 g events (i.e., probability of detection of about 85%). Setting the threshold to 0.2 g to 0.22 g also allows the radar to reject false alerts where true vertical load is less than 0.3 g (i.e., probability of false alert to be less than 20%). These statistics can be dictated by regulatory guidance.

Turbulence below the 0.2 or 0.22 g load threshold and above a nominal value (e.g., 0.1 g) are provided as magenta speckled or dotted regions on display 16 by processor 14 and module 30 in one embodiment. The magenta speckled regions correspond to the size and shape of the lower level turbulence regions. To avoid confusion of a solid magenta representation with a magenta speckle or dot of a speckled region, a minimum display size for a solid magenta representation can be utilized for detections of turbulence above the threshold in one embodiment. The minimum display size can be a fixed number of pixels (e.g., four or more, eight or more, etc.) or a number of pixels associated with a geographic area (e.g., a one-half nautical mile (nm), 1 mile, etc.). The speckle or dot in the speckled magenta region can be one pixel in one embodiment.

In addition, or alternatively, the graphical indication of the higher level of turbulence can be subjected to an inflation factor which increases the size of the solid magenta representation in other embodiments. The inflation factor can be computed by a number of algorithms within module 30. The algorithms can include one or more or a combination of a peak turbulence within a given radius algorithm, a turbulence detection density algorithm, a filtered peak turbulence within a given radius algorithm. The filter can be a spatial filter in range and azimuth or Cartesian coordinates. Alternatively, temporal filters are possible.

Referring to FIG. 1, weather radar system or hazard warning system 10 includes sensor inputs 12, a processor 14, display 16, a user input 18, and a memory 20. Hazard warning system 10 may acquire horizontal and/or vertical reflectivity profiles and direct turbulence detection information via sensor inputs 12. Sensor inputs 12 generally include a radar antenna 22, a lightning detector 24, and a temperature sensor 26. According to other exemplary embodiments, sensor inputs 12 may include any type of sensor or detector that may provide data related to direct or inferred measurement or detection of weather conditions and/or hazards. User input 18 allows a user to select display modes, and provide other input parameters.

Processor 14 is generally configured to process data received from sensor inputs 12 to determine turbulence levels and provide turbulence level indications on display 16. Processor 14 can include turbulence detector 28, inferred turbulence detector 29, and module 30 which cooperate to provide graphical indications of levels of turbulence on display 16 in one embodiment. Alternatively, processor 14 uses radar return signals from antenna 22 and detector 28 to detect size, level, and location of turbulence and does not include detector 29.

Processor 14 can generate a velocity parameter 32 or other Doppler data, a spectral width parameter 34, a reflectivity parameter 36, and a range parameter 38 based on return data from sensor inputs 12, data or commands from user input 18, or data or instructions from memory 20. According to various exemplary embodiments, processor 14 can be any hardware and/or software processor or processing architecture capable of executing instructions and operating on data related to hazard detection and display. According to various exemplary embodiments, memory 20 can be any volatile or non-volatile memory capable of storing data and/or instructions related to hazard warning system 10.

Direct turbulence detector 28 is configured to provide turbulence data based on a direct measurement of spectral width, for example spectral width parameter 34, from radar antenna 22. A large spectral width corresponds to turbulence. Direct turbulence detector 28 can provide a turbulence hazard indication on display 16. In one embodiment, turbulence is detected in accordance with TSO-C63d.

Inferred turbulence detector 29 is configured to provide inferred or unmeasured turbulence data using measured data. Inferred turbulence detector 29 can receive data inputs derived from one or more of spectral width parameter 34, reflectivity parameter 36, and/or range parameter 38.

Inferred turbulence detector 29 can also receive temperature data from temperature sensor 26 and data from lightning detector 24. Temperature data can include a local atmospheric temperature, local temperature variations with time, local temperature variations with altitude, a remotely determined temperature, and/or remotely determined temperature gradients in either range or altitude. Processor 14 can also include a cell tracking module.

Display 16 provides graphical representations of weather and hazards. The current regulatory environment as defined by governmental regulatory agencies supports display of basic radar sensor information as red, yellow, and green for radar reflectivity calibrated to rainfall rate and magenta as turbulence. Indications of turbulence levels are provided so that higher turbulence areas are readily ascertainable in one embodiment. The higher turbulence areas can be made larger than the area actually detected or inferred to distinguish from smaller lower levels of turbulence in one embodiment.

Display 16 can be any device for providing graphical representations of weather. Display 16 can be a multifunctional display of any technology, a stand alone display, a hand held display, etc. Display 16 can be a head down liquid crystal display, a head up display, a helmet display, etc. In one embodiment, display 16 is an avionic display.

Figure 2:
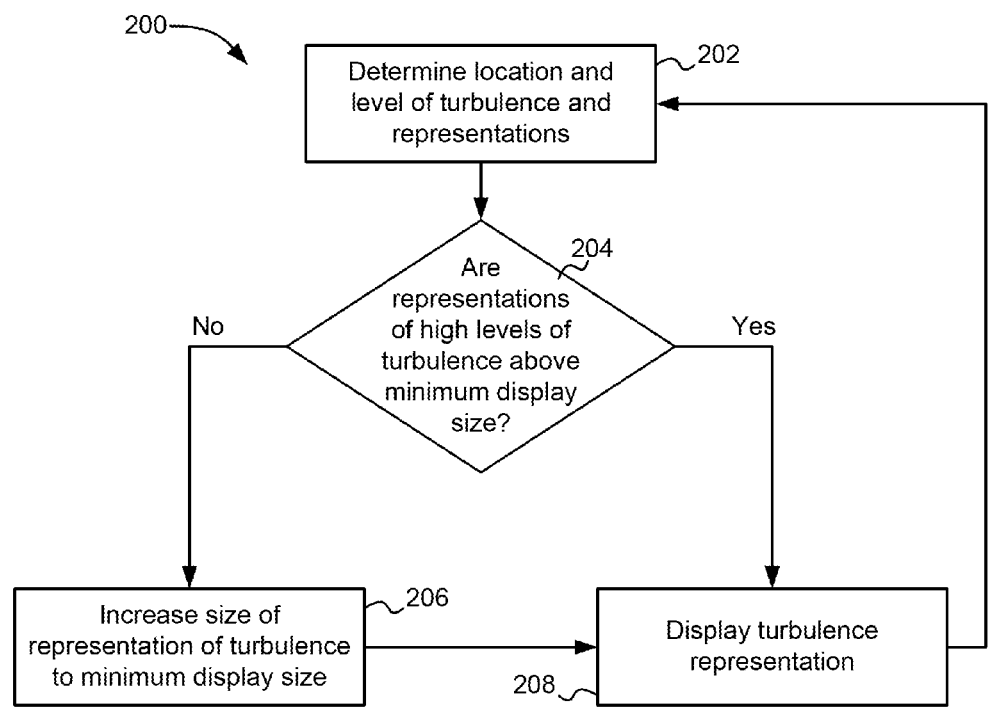
FIG. 2 is a functional flow diagram of a process executed in the hazard warning system of FIG. 1 according to an exemplary embodiment.

With reference to FIG. 2, a process 200 shows operation of system 10 in accordance with one exemplary embodiment. Processor 14 utilizes turbulence graphics module 30 to cause display 16 to provide indications of turbulence of at least two levels. At a step 202, processor 14 determines location and levels of turbulence. Processor 14 can utilize any method for determining location and levels of turbulence. For example, location and levels of turbulence can be inferred or directly determined using weather radar data. Alternatively, location and levels of turbulence can be determined from other sensor data or from weather data sourced from off the aircraft.

At a step 204, module 30 determines if each representation of higher turbulence is above a minimal display size. If so, module 30 advances to a display step 208. If not, module 30 advances to step 204 and makes the representation a minimal display size. The representation can be expanded by increasing its radius or increasing its perimeter. In one embodiment, radial expansion about a center of the regions can be utilized. Alternatively, expansion in one or more dimensions can be utilized.

At a step 208, module 30 causes display 16 to display the representation (such as by filling a graphic memory or frame buffer). After step 208, system 10 or processor 14 returns to step 202. Display 16 can display the representation increased in step 206 as well as other representations of lower levels of turbulence and representations of higher levels of turbulence that did not need an increase of size in step 206.

The minimal display size can be defined as a minimum number of pixels in one embodiment. In one embodiment, the minimum number of pixels is great enough to distinguish from the pixels used to provide a speckle in a speckled region indicating lower levels of turbulence. In one embodiment, the minimum number of pixels is 4, 5, 6, 7, 8, etc. According to another embodiment, the representation can be increased to represent minimum distance associated with a geographic distance such as a one-half nautical mile or one nautical mile radius. The minimum display size of the representation can be related to the size and/or resolution of display 16.

Figure 3:
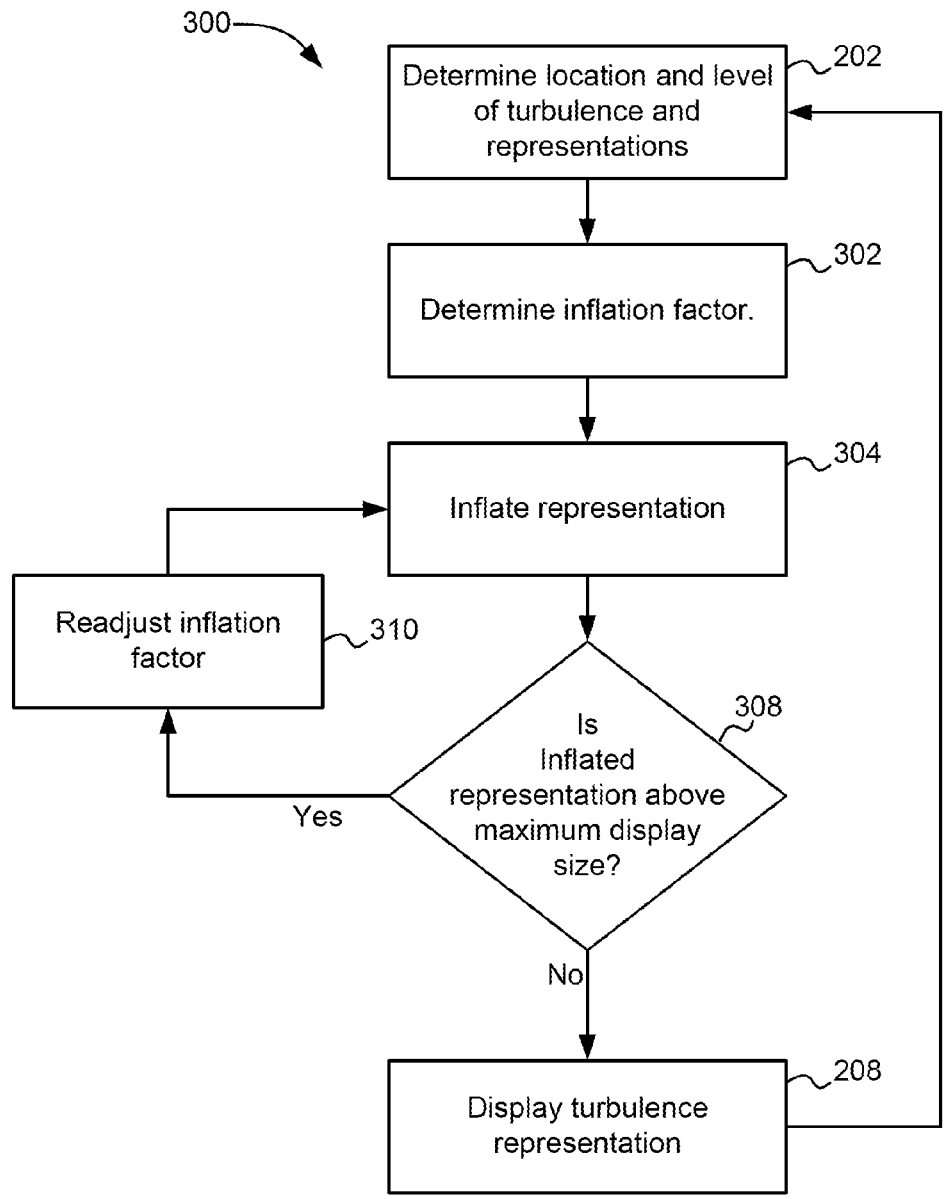
FIG. 3 is a functional flow diagram of a process executed in the hazard warning system of FIG. 1 according to another exemplary embodiment.

With reference to FIG. 3, a process 300 is similar to process 200 and shows operation of system 10 in accordance with another exemplary embodiment. Process 300 uses step 202 discussed above with reference to FIG. 2. At a step 302, an inflation factor is determined for a representation of higher turbulence by processor 14 and module 30. The inflation factor can represent an increase of display size for a representation of higher turbulence. The inflation factor can be related to several parameters including peak turbulence within a given radius, turbulence density detection (e.g., the number of turbulence detections with exceed a threshold within a given radius), or some combination of these approaches, for example, peak turbulences above 0.4 or 0.5 g load within a given radius (e.g., 0.5 nautical miles (nm)) indicates that the inflation factor should be larger. According to another example, detections of high turbulence regions are inflated greater if there are a larger number of high turbulence areas (e.g., greater than 0.4 g load) in a vicinity (e.g., within a 1 nautical mile radius). High turbulence density may also indicate that the inflation factor should be larger. Once the inflation factor is chosen, the representation of higher turbulence is inflated to a larger display size. The size can be inflated in a squared shaped or radial manner in one embodiment.

According to an alternative embodiment, module 30 can employ filtering to reduce flashing on display 16 due to sudden changes in turbulence levels or density. A filtered peak turbulence within a given radius, or some combination of filtering with the above approaches can be utilized to create the inflation factor. The filtering can be a temporal or spatial filter (e.g., range and azimuth).

At a step 304, the region of higher turbulence is inflated using the inflation factor. The inflations factor may indicate a percentage increase in area (e.g., 110 percent, 200 percent, 300 percent, etc). A graphical expansion algorithm uses the inflation factor to increase the size of the representation of higher turbulence. The representation can be increased or augmented in a radial fashion, in an X and Y direction, or a unilateral direction. The representation can be increased in area according to various shapes (e.g., pie-shaped, square-shaped, rectangular, circular, oval-shaped, etc.). In one alternative embodiment the representation can be extended by connecting it to a neighboring representation if the density of higher turbulence is large.

At a step 308, module 30 determines if the region of higher turbulence is above a maximum display size. If so, module 30 advances to a step 310. If not, module advances to step 208. The maximum size can be selectable. At step 310, module 300 adjusts the inflation factor and resizes the representation with the new inflation factor in step 304. Steps 308 and 310 prevents erroneous augmentation of representations such that the turbulence region is not increased too large, such as filling an entire screen or large portions of the screen of display 16. Further, excessively large augmentation of turbulence regions may result in the pilot unnecessarily avoiding an area.

Figure 4:
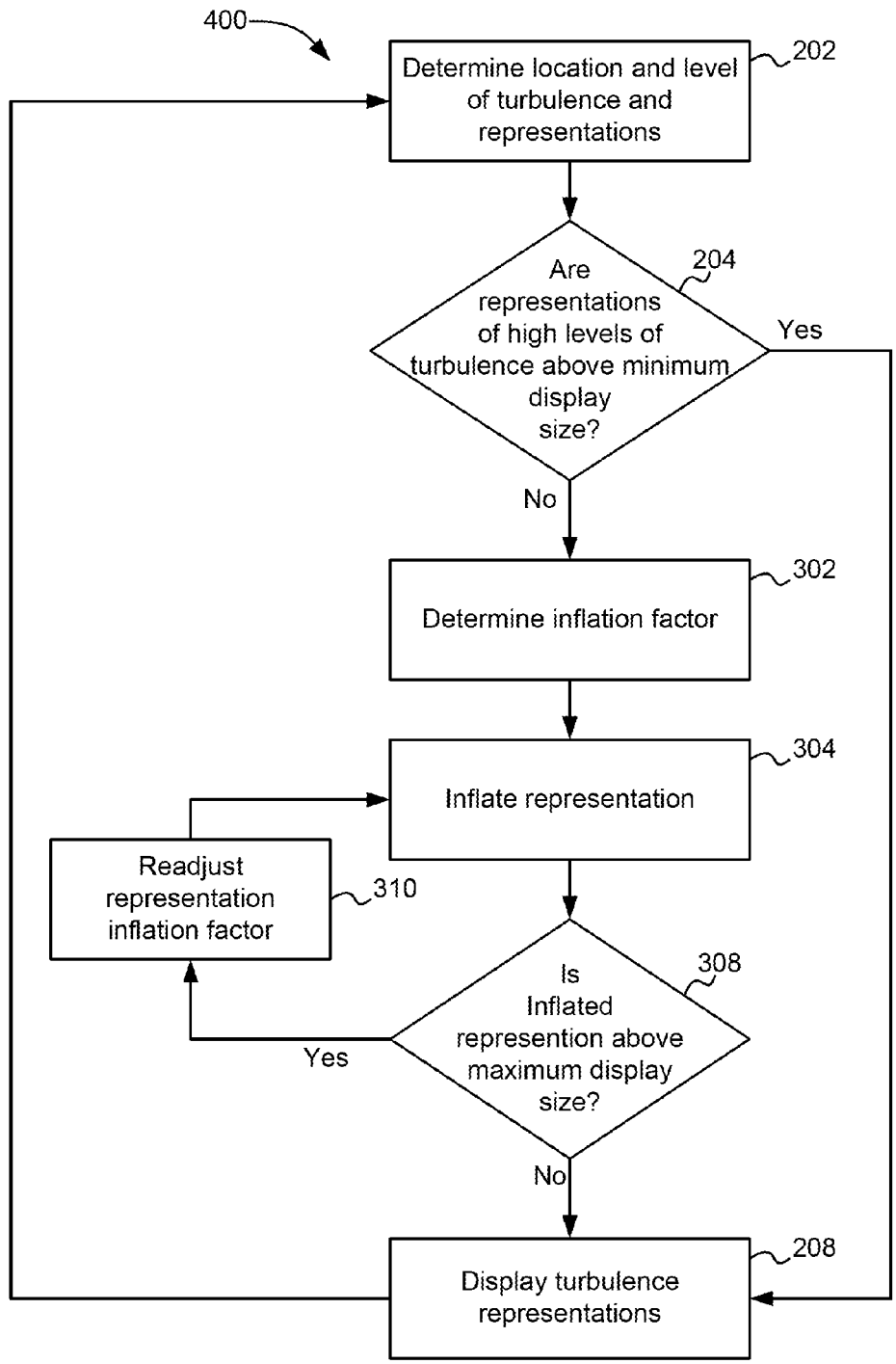
FIG. 4 is a functional flow diagram of a process executed in the hazard warning system of FIG. 1 according to yet another exemplary embodiment.

With reference to FIG. 4, a process 400 is similar to process 200 and process 300 and shows operation of system 10 in accordance with another exemplary embodiment. Process 400 utilizes step 202 and inflates a region of higher turbulence at a step 304 if a region is not above a minimum display size. Process 400 uses the inflation factor of steps 302 and 304 to inflate the region if a minimum display size is not present. Steps 308 and 310 can also be used to ensure that a maximum size is not reached. According to an alternative embodiment, process 300 and process 400 can include a step to ensure that the inflated region is above the minimum display size.

According to various exemplary embodiments, the process flow of FIGS. 2-4, may be embodied as hardware and/or software. In exemplary embodiments where the processes are embodied as software, the processes may be executed as computer code on any processing or hardware architecture or in any weather radar system such as the WXR-2100 available from Rockwell Collins.

Figure 5:
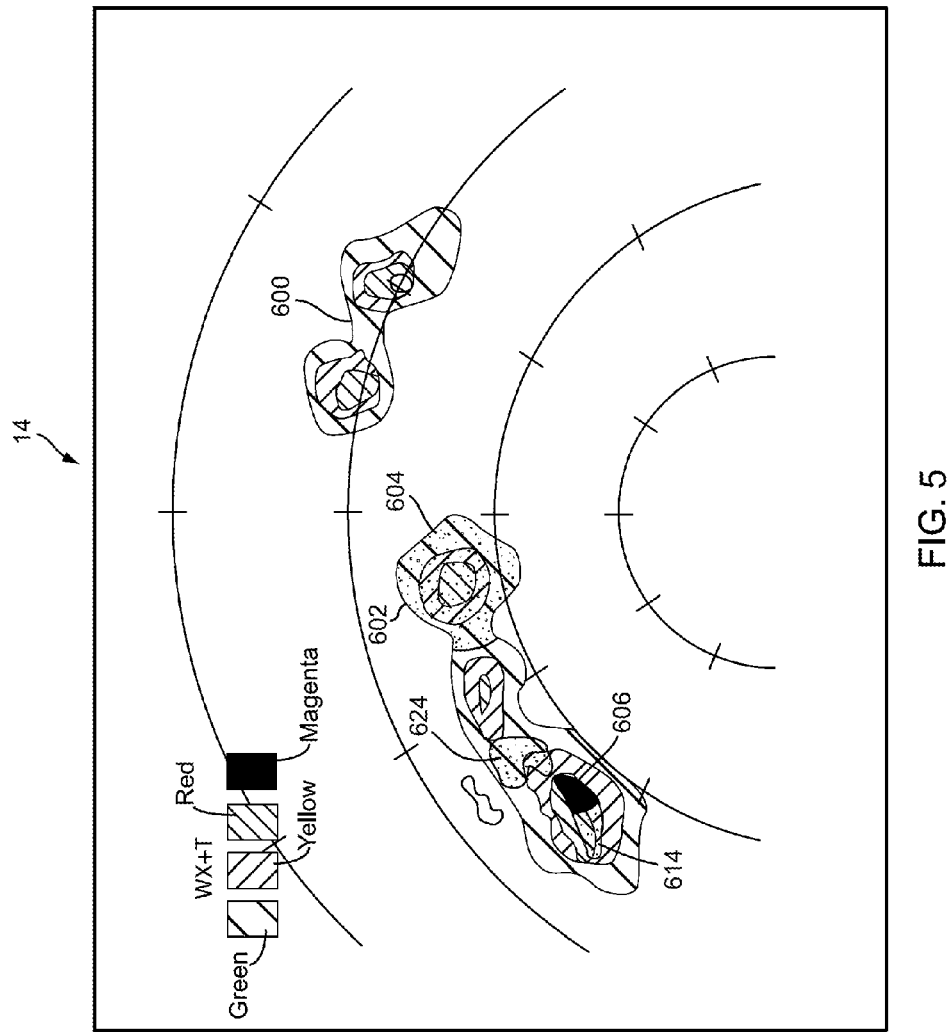
FIG. 5 is a screenshot of a horizontal or plan view display for use in the system illustrated in FIG. 1 according to an exemplary embodiment.

With reference to FIG. 5, display 16 can include a horizontal view or plan view display including weather regions 600 and 602 which are color coded as illustrated in FIG. 5. Weather region 602 can include a graphical representation 604 of a lower level turbulence (e.g., ride through turbulence) region. Representation 604 is shown as a speckled region with magenta dots and showing the color of weather region 602 beneath representations 604.

A graphical representation 606 can represent turbulence of a higher level. Representation 606 is shown as solid magenta which blocks the color of the weather regions underneath representation 606 in one embodiment. A graphical representation 614 of a ride through turbulence region is embodied as a speckled region and shows the color of weather region 602 beneath representation 614. A representation 624 is similar to representations 604 and 614. In order to distinguish between representation 606 and speckles of magenta in representation 614, module 40 ensures that representation 606 is of sufficient size to distinguish it from magenta speckles associated with symbol or representations 604, 614. and 624. Representations 604, 606, 614, and 624 are depicted in accordance with the size and location of their corresponding sensed turbulence regions, however, the size of representation 606 may adjusted as described herein to improve readability according to one embodiment.

Figure 6:
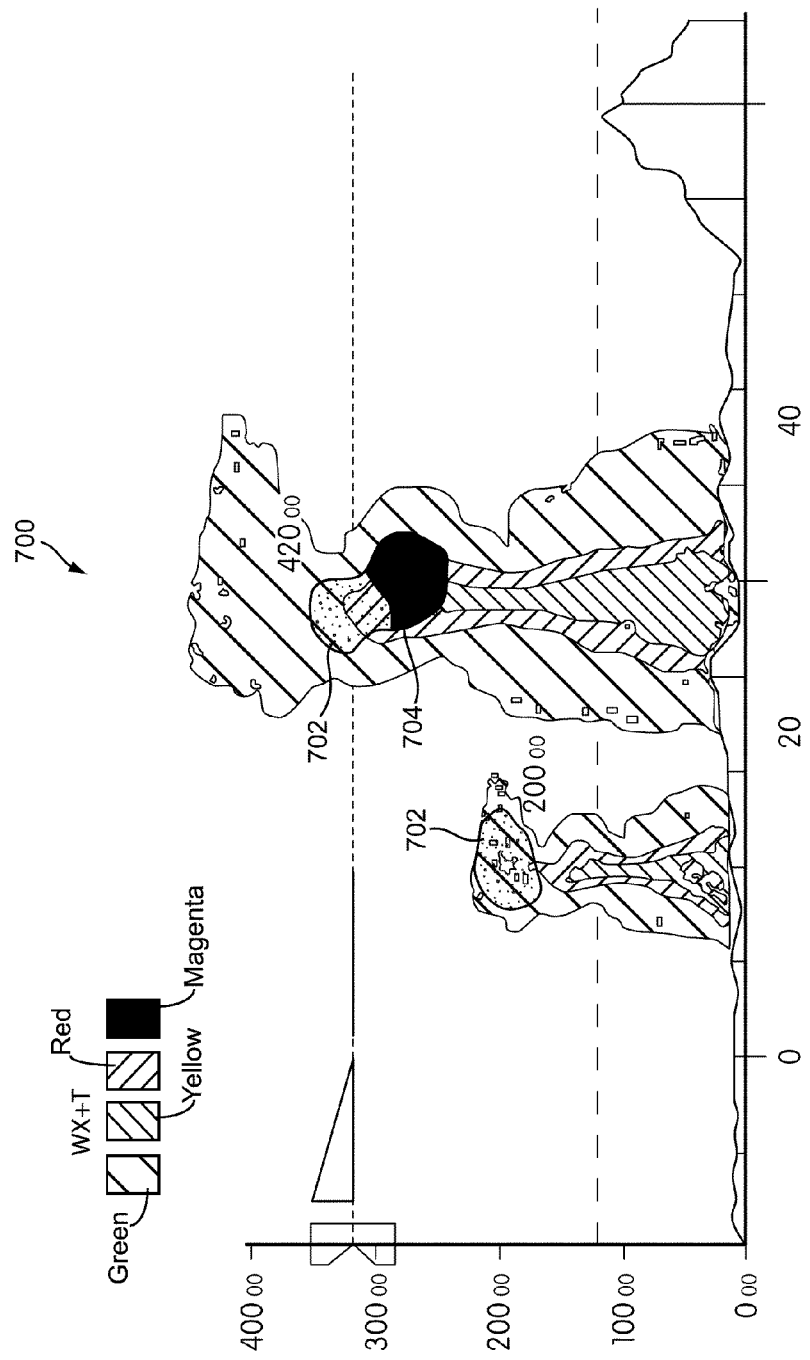
FIG. 6 is a screenshot of a vertical view display for use in the system illustrated in FIG. 1 according to an exemplary embodiment.

With reference to FIG. 6, display 16 can include a vertical situation view display. Display 16 can include similar features to those shown in FIG. 5 including speckled turbulent regions or representations 702 and a solid turbulence region 704. Solid turbulence region or representation 704 corresponds to a higher level of turbulence while speckled turbulence representations 702 correspond to a ride through or lower level of turbulence. Representation 704 is sized to ensure that it can be distinguished from magenta speckles in representations 702. Representations 702 and 704 correspond on display 16 to the size and location of their respective sensed turbulence regions.

The weather depiction in FIGS. 5 and 6 includes color patterns consistent with typical rainfall rate displays except the radar reflectivity can be corrected to normalized atmospheric moisture content according to one embodiment. Turbulence is sensed based on radar spectral width and scaled to aircraft RMS vertical load in one embodiment. In one embodiment, color level is associated with weather threat level, i.e., probability of lightning, hail, inferred turbulence, etc.

Figure 7:
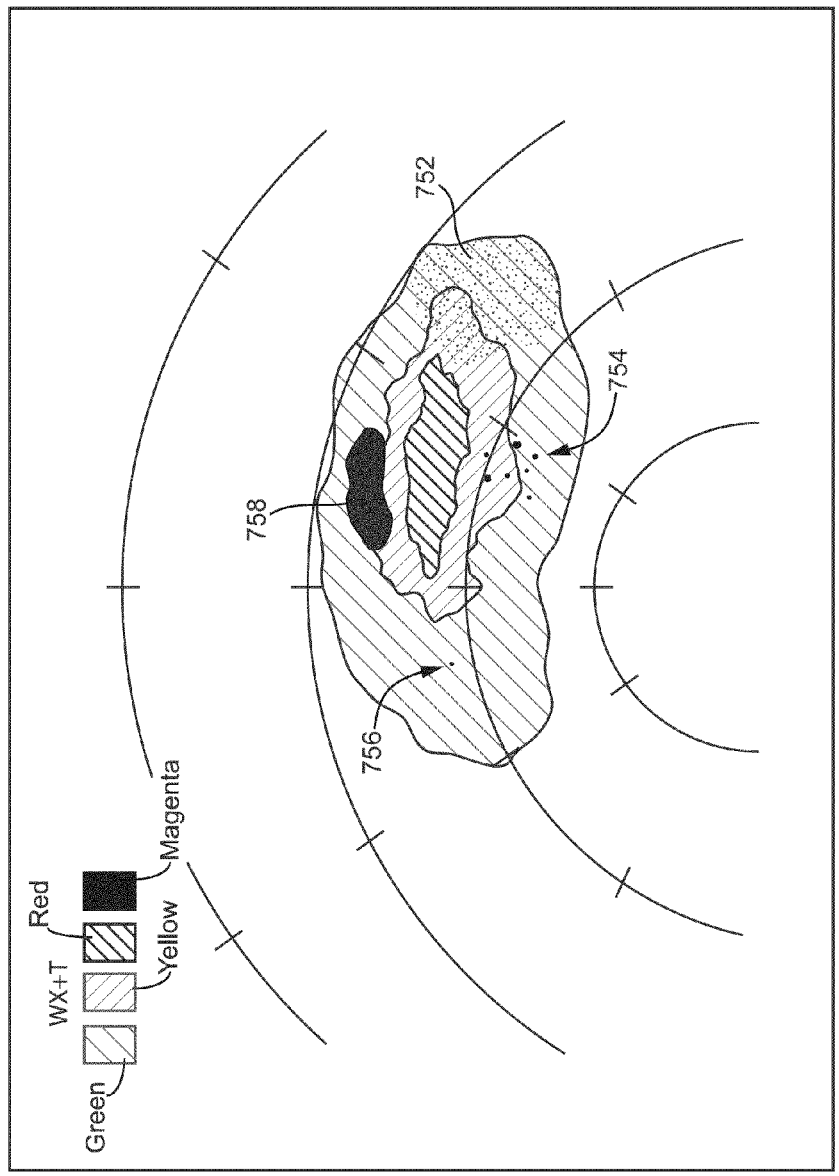
FIG. 7 is a screen shot showing turbulence representations before adjustment of higher turbulence representations by the hazard warning system of FIG. 1.

With reference to FIG. 7, display 16 shows representations 754 and 756 before adjustment of their size by module 40. Representation 752 is a magenta speckled region which can be confused with smaller representations 754 and 756 of solid magenta showing higher levels of turbulence. A larger representation 758 of higher turbulence is also shown.

Figure 8:
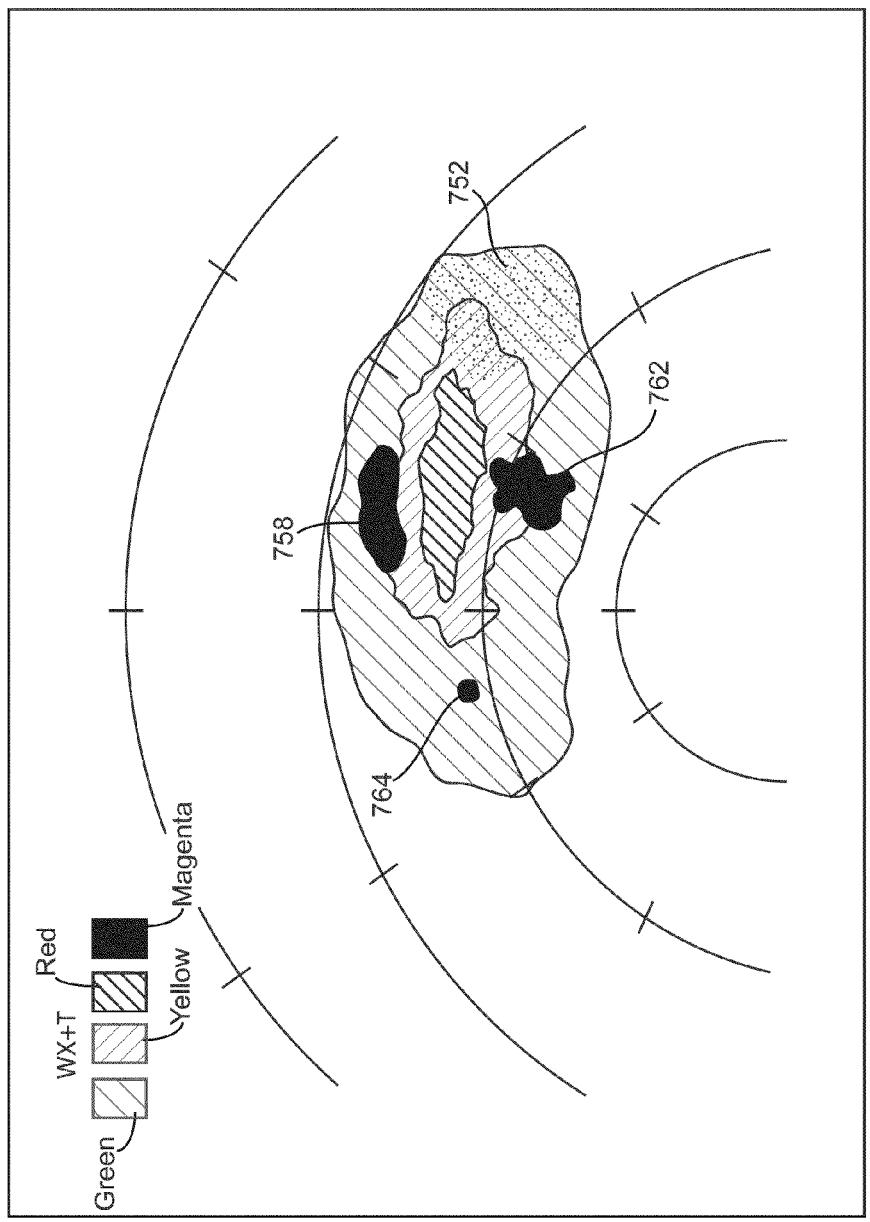
FIG. 8 is a screen shot showing turbulence representations after adjustment of higher turbulence representations, by the system illustrated in FIG. 1 according to an exemplary embodiment.

With reference to FIG. 8, display 16 shows turbulence representations 754 and 756 (FIG. 7) adjusted by module 40 in accordance with an exemplary embodiment is shown. Representation 762 is an inflated version of representations 754, and representation 764 is an inflated version of representation 756. Representations 764 and 762 are readily distinguishable from the dots or speckles in representation 752.

While the detailed drawings, specific examples, detailed algorithms and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The graphic representations shown are exemplary only. The hardware and software configurations shown and described may differ depending on the chosen performance characteristics and physical characteristics of the weather radar and processing devices. For example, the type of system components and their interconnections may differ. The systems and methods depicted and described are not limited to the precise details and conditions disclosed. The flow charts show preferred exemplary operations only. The specific data types, graphical symbols and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. A method of displaying areas of turbulent weather, comprising:
   processing data representative of weather conditions;
   displaying the weather conditions on a display;
   detecting turbulence;
   providing at least one first graphical element upon the display, wherein the first graphical element has a first size and a first location representing a size and a location of the turbulence at a first level, the first level being below a threshold; and
   providing at least one second graphical element upon the display, wherein the second graphical element has a second size and second location representing a size and a location of the turbulence at a second level, the second level being above the threshold, providing the at least one second graphical element comprising determining an initial size of the second graphical element based on a geographic area of the turbulence, determining whether to adjust the initial size of the second graphical element based on a minimum display size, and determining the second size of the second graphical element based on the minimum display size;
   wherein determining the second size based on the minimum display size comprises:
      determining whether the initial size of the second graphical element based on the geographic area of the turbulence at the second level is less than the minimum display size; and
      setting the second size to the minimum display size in response to determining the initial size is less than the minimum display size; and
   wherein the second size is determined based on an inflation factor, wherein the inflation factor is a function of a peak turbulence within a given radius, a filtered peak turbulence within a given radius, a density of turbulence at the second level, or a number of turbulence detections which exceed the threshold within a given radius.

2. The method of claim 1, wherein the first graphical element includes a plurality of dots superimposed upon the display of weather conditions.

3. The method of claim 1, further comprising:
   displaying the weather conditions using a plurality of colors to represent a corresponding plurality of weather severity levels, wherein at least one of the first graphical element and the second graphical element are rendered in a color different from the plurality of colors used to represent the weather severity levels.

4. The method of claim 3, wherein the first graphical element and the second graphical element are magenta coloring.

5. The method of claim 1, wherein the second graphical element is an icon configured to contrast in appearance with the display of weather conditions.

6. The method of claim 1, further comprising reducing the second size if the second size is above a maximum display size after being inflated using the inflation factor.

7. An avionics weather display device for use with a display, the avionics weather display device comprising:
   a processor configured to process weather radar data representative of weather conditions, wherein the processor detects turbulence and generates data configured to cause a display to provide at least one first graphical element, wherein the first graphical element has a first size and a first location representing a size and a location of the turbulence at a first level, the first level being below a threshold, wherein the processor is configured to cause the display to provide at least one second graphical element, wherein the second graphical element has a second size and second location based on a size and a location of the turbulence at a second level above the threshold, wherein the second size is determined using an inflation factor, wherein the inflation factor is a function of peak turbulence within a given radius, a filtered peak turbulence within a given radius, density of turbulence at the second level, or the number of turbulence detections which exceed the threshold within a given radius.

8. The system of claim 7, wherein the first and second graphical elements are superimposed over the graphical elements associated with the weather conditions.

9. The system of claim 7, wherein the display uses a plurality of colors to represent a corresponding plurality of weather severity levels, wherein at least one of the first graphical element and the second graphical element is rendered in a color different from the plurality of colors used to represent the weather severity levels.

10. The system of claim 9, wherein the first graphical element includes a plurality of dots over magenta coloring superimposed upon the display of weather conditions.

11. The system of claim 7, wherein the second graphical is solid magenta coloring.

12. The system of claim 7, wherein the processor is configured to determine an initial size of the second graphical element based on a geographic area of the turbulence, determine whether to adjust the initial size of the second graphical element based on at least one of a minimum display size or an inflation factor, the inflation factor based on a measure of severity of the turbulence, and determine the second size of the second graphical element based on the minimum display size;

wherein, when the processor determines the second size based on the minimum display size, the processor is configured to:

determine whether the initial size of the second graphical element based on the geographic area of the turbulence at the second level is less than the minimum display size; and set the second size to the minimum display size in response to determining the initial size is less than the minimum display size.

13. One or more computer-readable storage media having instructions stored thereon that, when executed by at least one electronic processor, cause the at least one electronic processor to:

detect turbulence at a first level below a first threshold and at a second level above the first threshold from weather radar data;

cause a display to provide at least one first graphical element, wherein the first graphical element has a first size and a first location representing a size and a location of the turbulence at a first level; and cause a display to provide at least one second graphical element, wherein the second graphical element has a second size and a second location representing a size and a location of the turbulence at a second level, the second level being above the threshold, wherein the second size of the second graphical element is determined using an inflation factor, wherein the inflation factor is related to a peak turbulence within a given radius, a filtered peak turbulence within a given radius, a density of turbulence at the second level, or a number of turbulence detections which exceed the threshold within a given radius.

14. The one or more computer-readable storage media of claim 13, wherein the first graphical element includes a plurality of dots superimposed upon weather conditions on the display.

15. The one or more computer-readable storage media of claim 13, wherein the second size is determined using an inflation factor, wherein the inflation factor is a function of the peak turbulence within a given radius or the filtered peak turbulence within a given radius.

16. The one or more computer-readable storage media of claim 13, wherein the inflation factor is a function of the turbulence density at the second level or the number of turbulence detections which exceed the threshold within a given radius.

17. The one or more computer-readable storage media of claim 13, wherein the second graphical element has a minimum size and the minimum size is at least four pixels.

18. The one or more computer-readable storage media of claim 13, wherein the second graphical element is provided so that small areas of severe turbulence are more noticeable in fields of lighter turbulence.

19. The one or more computer-readable storage media of claim 13, wherein, wherein the second graphical element is solid magenta coloring.

20. The one or more computer-readable storage media of claim 19, wherein the first graphical element is magenta coloring with specking.

\* \* \* \* \*